United States Patent [19]
Rowan et al.

[11] Patent Number: 5,579,946
[45] Date of Patent: Dec. 3, 1996

[54] THERMAL INSULATING CONTAINERS FOR RETAINING FOOD AND BEVERAGE

[76] Inventors: Donald Rowan; Donald Ensley, both of 2115 E. Spring St., Long Beach, Calif. 90806

[21] Appl. No.: 335,158

[22] Filed: Nov. 7, 1994

[51] Int. Cl.⁶ .................................................. B65D 25/18
[52] U.S. Cl. ........................ 220/420; 220/426; 220/427; 220/410; 220/627
[58] Field of Search ........................ 220/420, 422, 220/423, 425, 426, 427, 408, 410, 23.83, 23.86, 469, 574, 627, 739, 912

[56] References Cited

U.S. PATENT DOCUMENTS

| | | | |
|---|---|---|---|
| 92,001 | 7/1869 | Pietsch . | |
| 1,706,436 | 3/1929 | Bright . | |
| 1,752,584 | 4/1930 | Biette | 220/410 |
| 2,526,165 | 10/1950 | Smith . | |
| 2,773,358 | 12/1956 | Palmer et al. . | |
| 3,331,522 | 7/1967 | Bridges | 220/420 |
| 3,745,290 | 7/1973 | Harnden, Jr. et al. | 220/408 |
| 4,184,601 | 1/1980 | Stewart et al. | 220/422 |
| 4,685,588 | 8/1987 | Kobayashi | 220/408 |
| 4,989,419 | 2/1991 | Brando et al. . | |
| 5,231,850 | 8/1993 | Morris . | |

FOREIGN PATENT DOCUMENTS

| | | | |
|---|---|---|---|
| 126922 | 3/1948 | Australia | 220/425 |
| 4136821 | 5/1992 | Germany | 220/408 |
| 41575 | 1/1930 | Netherlands | 220/425 |

*Primary Examiner*—Stephen J. Castellano
*Attorney, Agent, or Firm*—Thomas I. Rozsa; Tony D. Chen

[57] ABSTRACT

A thermal insulating bowl or container which is for keeping the original temperature of the food or beverage contained therein. The thermal insulating container is to prevent heat transfer from occurring by radiation, convection and conduction. This is achieved by having the container with a double-wall structure. The gap between the walls is a vacuum or partial vacuum cavity which encompasses both the sidewalls and the bottom of the container. The cavity may be partially filled with gas such carbon dioxide ($CO_2$) or dry nitrogen $N_2$. By having this vacuumed or partially gas filled, food and beverage kept in the container can remain warm or cold for an extended period of time.

24 Claims, 3 Drawing Sheets

THERMAL INSULATING CONTAINERS FOR RETAINING FOOD AND BEVERAGE

BACKGROUND OF THE INVENTION

1. Field of The Invention

The present invention relates to the field of containers. More particularly, the present invention relates to the field of thermal insulating containers used for maintaining the original temperature of the food or beverage.

2. Description of The Prior Art

Generally, food and beverage containers are widely used throughout the United States and all over the world. In the prior art, there have been numerous types of containers for maintaining items such as food or liquid in a cold condition for a period of time. These containers have a chamber which is filled with chillable gel for keeping the food or liquid chilled. Alternatively, the prior art containers use ice for keeping the food or liquid chilled. The disadvantage of using chillable gel or ice is that they do not last long in a warm environment and become ineffective in a short period of time.

The following seven (7) prior art patents were uncovered in the pertinent field of the present invention:

1. U.S. Pat. No. 93,001 issued to Pietsch on Jul. 27, 1869 for "Pitcher" (hereafter "the Pietsch Patent");
2. U.S. Pat. No. 1,706,436 issued to Bright on Mar. 26, 1929 for "Container" (hereafter "the Bright Patent");
3. U.S. Pat. No. 2,526,165 issued to Smith on Oct. 17, 1950 for "Cooling Receptacle" (hereafter "the Smith Patent");
4. U.S. Pat. No. 2,773,358 issued to Palmer et al. on Dec. 11, 1956 for "Self-Cooling Container" (hereafter "the Palmer Patent");
5. U.S. Pat. No. 3,302,428 issued to Stoner et al. on Feb. 7, 1967 for "Device For Cooling Or Keeping Cool A Beverage Container" (hereafter "the Stoner Patent");
6. U.S. Pat. No. 4,989,419 issued to Brando et al. on Feb. 5, 1991 for "Chill-Retention Food Service Tray" (hereafter "the Brando Patent"); and
7. U.S. Pat. No. 5,231,850 issued to Morris on Aug. 3, 1993 for "Cooler Container" (hereafter "the Morris Patent").

The Pietsch Patent discloses an improved pitcher for cooling liquids. It is constructed with a space between outer walls of the pitcher and is filled with powdered charcoal or some other suitable non-conducting material. The pitcher has an ice chamber, a drip chamber and a liquid chamber which surrounds the ice chamber so that the liquid can be cooled. The drip chamber is located at the bottom of the pitcher where an interior tube connects the ice chamber with the drip chamber so that when the ice is melting, the liquid can flow through the interior tube into the drip chamber and is later poured out from the drip chamber through a vertical tube, extending up along the rear side of the pitcher.

The Bright Patent discloses a container with a double wall structure so as to provide a dead space or from which the air may be exhausted to form a vacuum. It includes a base portion, an upper bowl like top portion for receiving the food to be cooled and a cover. The cover has means for retaining the cooling medium such as dry ice or carbon dioxide ice. The chamber within the cover has perforated walls so that the gas may be introduced into the chamber.

The Smith Patent discloses a cooling receptacle. The cooling receptacle includes a continuous outer wall and a continuous inner wall and forms an enclosed coolant chamber between the outer and inner walls. There is a plug at the bottom of the cooling receptacle where the liquid can be poured into the coolant chamber and sealed by the plug.

The Palmer Patent discloses a self cooling container. It includes an inner receptacle and a closure cap. Surrounding the inner receptacle is the outer member which completely surrounds the inner receptacle and is provided with an insulative jacket. A cooling chamber is formed around the inner receptacle and terminates at its lower portion in an expansion chamber portion having a bottom forming a completely enclosed chamber surrounding the inner receptacle. A cooling cartridge is mounted within the expansion chamber portion such that when the cooling cartridge is punctured, the gas escapes into the cooling chamber to cool the inner receptacle.

The Stoner Patent discloses a device for cooling or keeping cool a beverage container. It includes a double walled cooling unit having an inner shell and an outer shell with a base plate. The two shells are hermetically sealed together with a coolant liquid inside, filling about 90% of the interim space. It also includes a can-supporting seat above the base plate spaced inwardly from an inner wall and joined thereto by a web portion lying below the can-supporting seat and above the base plate, thereby providing a well around the seat.

The Brando Patent discloses a chill retention food service tray. It includes a bottom tray member with a bottom panel, a bottom rim wall projecting upwardly from the periphery of the bottom panel, and at least one stiffening rib projecting upwardly to a predetermined level above a medial portion of the bottom panel. A top tray member interfits with and is affixed to the bottom tray member. The top tray member includes a service support panel positioned immediately above the top of the stiffening rib. A top rim wall projects upwardly above the service panel and engages the bottom rim wall around the periphery of the two panels. The top and bottom tray members define a segmented main gel chamber which is filled with a chillable gel.

The Morris Patent discloses a cooler container. It includes an airtight lid, a wall and a floor. There is a labyrinth seal means at the top of the container wall which mates with the peripheral zone of the lid. The floor and wall are composed of an inner plastic skin and a spaced outer plastic skin which defines the floor and the upstanding wall and defines a cavity between the inner and outer skins. A center post maintains the skins in spaced relation during the assembly. The upper end of the inner and outer skins define an annular opening through which refrigerant gel is introduced into the cavity. The upstanding terminal end of the wall is closed by a ring member having three upstanding annular ridges which mate with the lid.

It can be seen that there is a need for a thermal insulating container to keep food warm for a longer period of time. There is also a need to keep beverage cold for a longer period of time. Therefore, it is highly desirable to have a very efficient and also very effective design and construction of a thermal insulating container for keeping the food warm or the beverage cold for an extended period of time.

SUMMARY OF THE INVENTION

The present invention is a novel and unique thermal insulating bowl or container for keeping the original temperature of the food or beverage contained therein. The primary objective of the present invention is to prevent heat transfer from occurring by radiation, convection and conduction. This is achieved by having the bowl or container with a double-wall structure. The cavity or space between the walls is a vacuum or partial vacuum cavity which encompasses both the sidewalls and the bottom of the container. The cavity can be partially filled with gas such as carbon dioxide ($CO_2$) or dry nitrogen ($N_2$). By having this cavity contain a vacuum or be partially gas filled, food and beverage kept in the container can remain warm or cold for an extended period of time.

It is therefore an object of the present invention to provide a thermal insulating container capable of keeping its contents warm or cold for an extended period of time.

It is an additional object of the present invention to provide a thermal insulating container having a double-wall structure which contains a vacuum or is partially filled with gas and which completely surrounds the sidewall and bottom of the container, so that the contents within the container is kept warm or cold for an extended period of time.

It is a further object of the present invention to provide a thermal insulating container having a double-wall structure in which the exterior wall is made of plastic material and the interior wall is made of metal material, such as aluminum (including polished aluminum) or stainless steel (including polished stainless steel), where the air is exhausted from the cavity between the walls to form a vacuum chamber, so that the contents within the container are kept warm or cold for an extended period of time.

It is an additional object of the present invention to provide a thermal insulating container having a double-wall structure in which the exterior and interior walls are made out of plastic material, where the air between the exterior and interior walls is exhausted from the cavity between the walls to form a vacuum chamber, so that the contents within the container are kept warm or cold for an extended period of time.

It is a further object of the present invention to provide a thermal insulating container having a double-wall structure in which the cavity between the exterior and interior walls is partially filled with gas such as carbon dioxide $CO_2$ or dry nitrogen $N_2$, so that the contents within the container are kept warm or cold for an extended period of time.

In one of the preferred embodiments of the present invention, the thermal insulating container is a food container having a double-wall structure. The double-wall structure has an exterior wall which is made out of plastic material and an interior wall which is made out of metal material, e.g., polished aluminum or polished stainless steel. The air between the exterior and interior walls is exhausted to form a vacuum chamber. The vacuum chamber can also be partially filled with gas such as $CO_2$ or $N_2$. With this embodiment of the present invention, the food is kept warm and fresh for an extended period of time.

In an alternative embodiment of the present invention, the thermal insulating container is a beverage pitcher having a double-wall structure which is completely made of plastic material. The air between the double-wall structure is exhausted to form a vacuum chamber. The vacuum chamber can also be partially filled with gas such as $CO_2$ or $N_2$. With this embodiment of the present invention, the beverage is kept cold for an extended period of time.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The primary objective of the present invention is to design a thermal insulating container which keeps heat from transferring. The present invention is designed to prevent all three types of heat transfer: convection, radiation and conduction.

Figure 1:
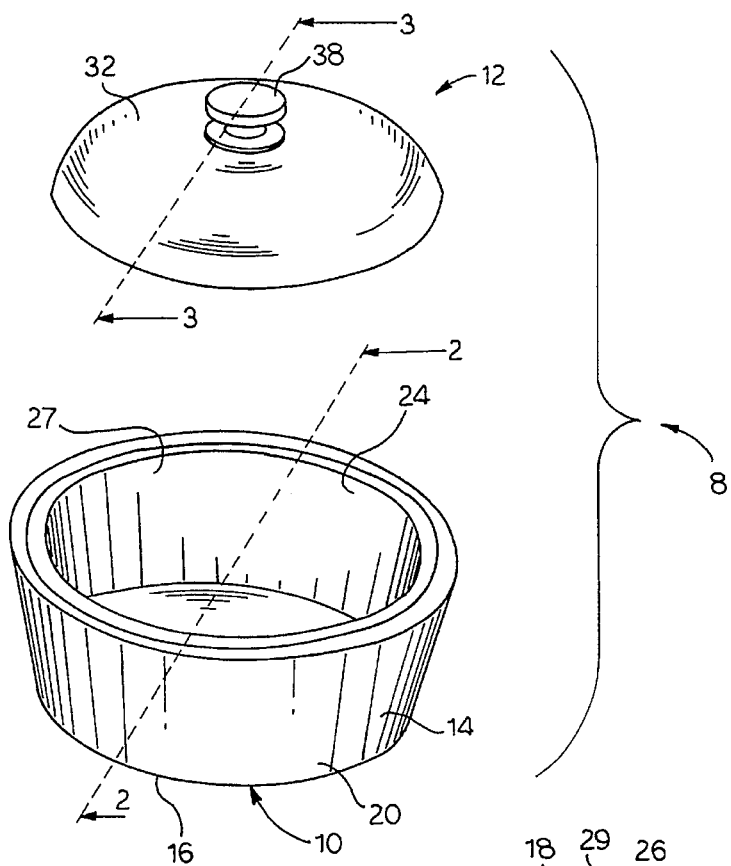
FIG. 1 is an exploded perspective view of one embodiment of the present invention thermal insulating container which is a food bowl with a lid.

Referring to FIG. 1, there is shown at 8 one embodiment of the present invention thermal insulating food container. Although a round bowl is shown, the bowl may be square, rectangular, oval or other shapes. The food container 8 is adapted for table use and is designed to keep food warm for an extended period of time. The thermal insulating container 8 is constructed of a double-wall structure throughout so as to provide a closed cavity from which the air may be exhausted to form a vacuum chamber. The thermal insulating container 8 includes a thermal insulating bowl 10 and a thermal insulating lid or cover 12, both having the same double-wall structure.

Figure 2:
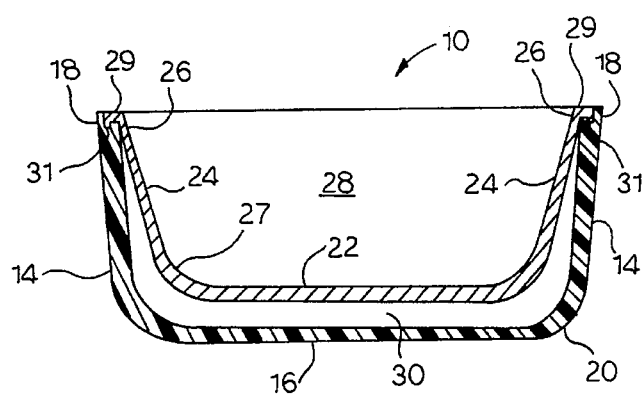
FIG. 2 is a cross-sectional view of the thermal insulating food bowl taken along line 2—2 of FIG. 1.

FIG. 2 shows a cross-sectional view of the thermal insulating bowl 10. Referring to FIGS. 1 and 2, the thermal insulating bowl 10 has an interior wall 27 made of metal material such as aluminum (including polished aluminum) or stainless steel (including polished stainless steel), and an exterior wall 20 made of plastic material. The interior wall 27 has a sidewall portion 24 which is integrally formed with and vertically extending upwardly and outwardly from a bottom wall portion 22, and has a tapered upper lip 26. The bottom wall portion 22 and the sidewall portion 24 define an interior chamber 28 for retaining the food. The exterior wall 20 has a sidewall portion 14 which is integrally formed with and vertically extending upwardly from a bottom wall portion 16, and has an upper rim 18. The tapered upper lip 26 is fixedly attached to the upper rim 18 of the sidewall portion 14 which forms a top edge 29 of the bowl 10. The exterior wall 20 and the interior wall 27 are positioned in a substantially parallel and spaced apart relationship, and form a sealed chamber 30 therebetween. The sealed chamber 30 is between the interior wall 27 and the exterior wall 20, and being exhausted of air to create a vacuum chamber for insulating the interior chamber 28 and keeping the food contained therein warm for an extended period of time.

There is formed an annular groove 31 at the upper rim 18 of the exterior wall 20 in which the tapered upper lip 26 of the interior wall 27 is connected. This connection is air-tight to form the sealed chamber 30. The metal tapered upper lip 26 is inserted into the annular groove 31 of the plastic exterior wall 20 and may be molded, glued or attached in any other conventional way known to one skilled in the art.

Figure 3:
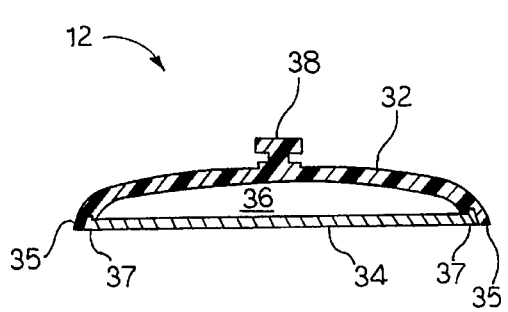
FIG. 3 is a cross-sectional view of the lid taken along line 3—3 of FIG. 1.

FIG. 3 shows a cross-sectional view of the thermal insulating lid 12. Referring to FIGS. 1 and 3, the thermal insulating lid 12 is sized to span the perimeter of the top edge 29 of the thermal insulating bowl 10 and thus provides an additional sealing surface which closes the thermal insulating bowl 10. The lid 12 is also a double-wall structure which includes a top wall 32 made of plastic material, a bottom wall 34 made of metal material such as aluminum or stainless steel, and a handle 38 for grasping the lid 12. The top and bottom walls 32 and 34 form another sealed chamber 36 therebetween, in which the sealed chamber 36 between the top and bottom walls 32 and 34 is exhausted of air, so that this vacuum chamber also serves to insulate the contents of the interior chamber 28 of the thermal insulating bowl 10. The top wall 32 has a circumferential edge 35, and the bottom wall 34 also has a circumferential edge 37. The top and bottom walls 32, 34 are positioned in a substantially parallel and spaced apart relationship, so that the circumferential edge 35 of the top wall 32 is air-tightly connected to the circumferential edge 37 of the bottom wall 34, thereby forming the sealed chamber 36. The top and bottom walls 32, 34 are connected together by a similar method as the thermal insulating bowl 10, and the description thereof will not be repeated.

The sealed chambers 30 and 36 of the thermal insulating bowl and lid 10, 12 respectively may be partially filled with gas such as carbon dioxide ($CO_2$) or dry nitrogen $N_2$. The advantages of partially filling with $CO_2$ or $N_2$, are as follows: (a) the gas will provide better insulation to the interior chamber 28 of the thermal insulating bowl 10; and (b) the gas also will provide additional support to the bottom wall portion 22 of the interior wall 27.

Figure 5:
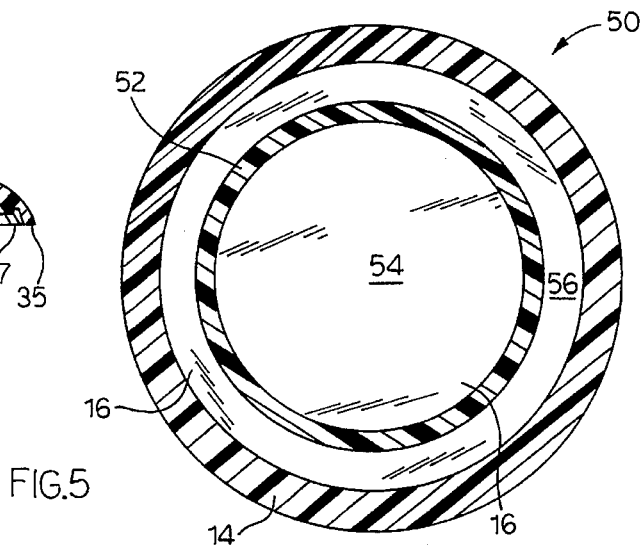
FIG. 5 is an enlarged cross-sectional view taken along line 5—5 of FIG. 4.
Figure 4:
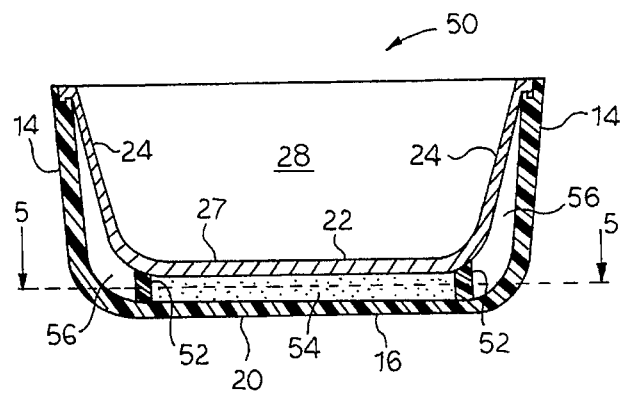
FIG. 4 is a cross-sectional view of an alternative embodiment of the thermal insulating food bowl.

Referring to FIGS. 4 and 5, there are shown cross-sectional views of another embodiment of the present invention thermal insulating bowl 50. It assembles and functions the same as previously described above except that the dead air space between the exterior wall 20 and the interior wall 27 is divided by a continuous partition 52 into two separate sealed chambers 54 and 56. The partition 52 is integrally connected to the bottom wall portion 22 of the interior wall 27 and the bottom wall portion 16 of the exterior wall 20. The sealed side chamber 56 is between the sidewall portion 24 of the interior wall 27 and the sidewall portion 14 of the exterior wall 20, and is exhausted of air, so that this vacuum chamber serves to insulate the contents of the interior chamber 28. The sealed bottom chamber 54 is between the bottom wall portion 22 of the interior wall 27 and the bottom wall portion 16 of the exterior wall 20, and is partially filled with gas such as $CO_2$ or $N_2$.

Figure 6:
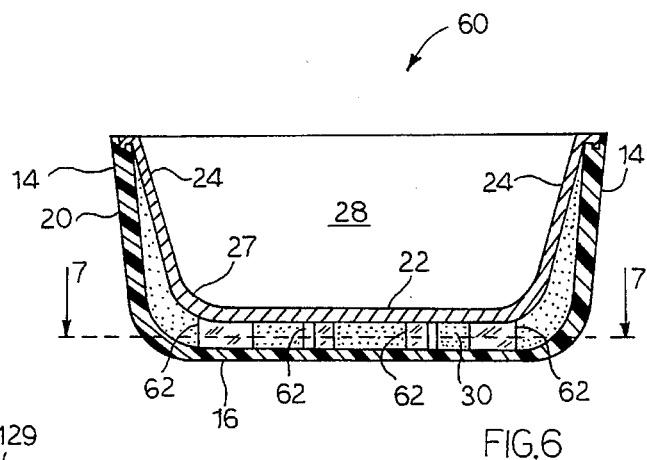
FIG. 6 is a cross-sectional view of another alternative embodiment of the thermal insulating food bowl.
Figure 7:
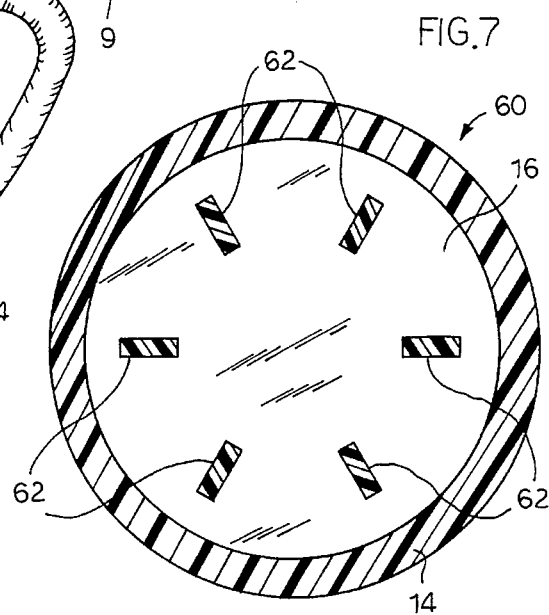
FIG. 7 is an enlarged cross-sectional view taken along line 7—7 of FIG. 6.

Referring to FIGS. 6 and 7, there are shown cross-sectional views of still another embodiment of the present invention thermal insulating bowl 60. It assembles and functions the same as previously described above except that a plurality of ribs 62 are provided between the bottom wall portion 22 of the interior wall 27 and the bottom wall portion 16 of the exterior wall 20. The ribs 62 provide support to the bottom wall portion 22 of the interior wall 27, and keep the bottom wall portions 22 and 16 in a spaced apart relation. Again, the sealed chamber 30 between the interior wall 27 and the exterior wall 20 may be a vacuum or may be partially filled with gas such as $CO_2$ or $N_2$.

The thermal insulating bowl 10 and lid 12 can be made from several materials. The manufacturing process which could accommodate the construction of the thermal insulating bowl 10 and lid 12 may be injection, thermoform, etc. or other molding process. The present invention conforms to conventional forms of manufacture, and is of simple construction and is easy to use.

One of the unique features of the present invention is that it is designed and constructed to prevent heat transfer in all three forms: radiation, convection and conduction. The surface of the metal interior wall 27 can be treated, such as polished, to form a radiation barrier. Therefore, in the case of radiation, heat transfer is prevented by the radiation barrier of the interior wall 27 of the thermal insulating bowl 10. In the case of the convection, heat transfer is prevented by the tapered upper lip 26 of the sidewall portion 24. In the case of the conduction, heat transfer is prevented by the sealed chamber 30.

Another unique feature of the present invention thermal insulating container 8 is that the food kept in the bowl 10 remains warm for an extended period of time. While the interior chamber 28 is approximately the same temperature as the food contained within the thermal insulating bowl 10, the exterior wall 20 of the bowl 10 is approximately room temperature, so that a person can hold the bowl 10 without being scalded, and the bowl 10 can be placed on top of the table without using any paddings.

Figure 8:
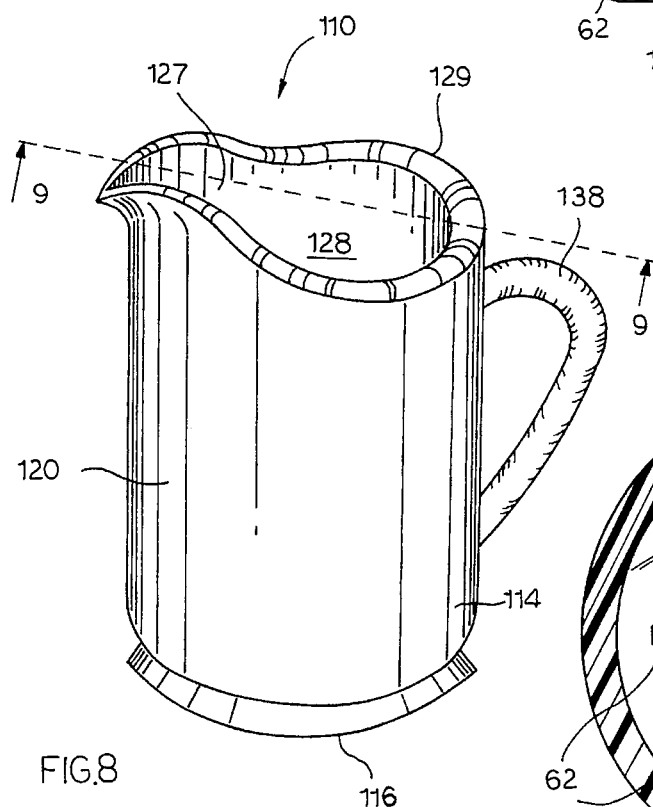
FIG. 8 is a perspective view of another embodiment of the present invention thermal insulating container which is a beverage pitcher.

Referring to FIG. 8, there is shown a perspective view of an alternative embodiment of the present invention thermal insulating pitcher 110 which is constructed of a double-wall structure throughout, so as to provide a closed cavity from which air may be exhausted to form a vacuum chamber.

Figure 9:
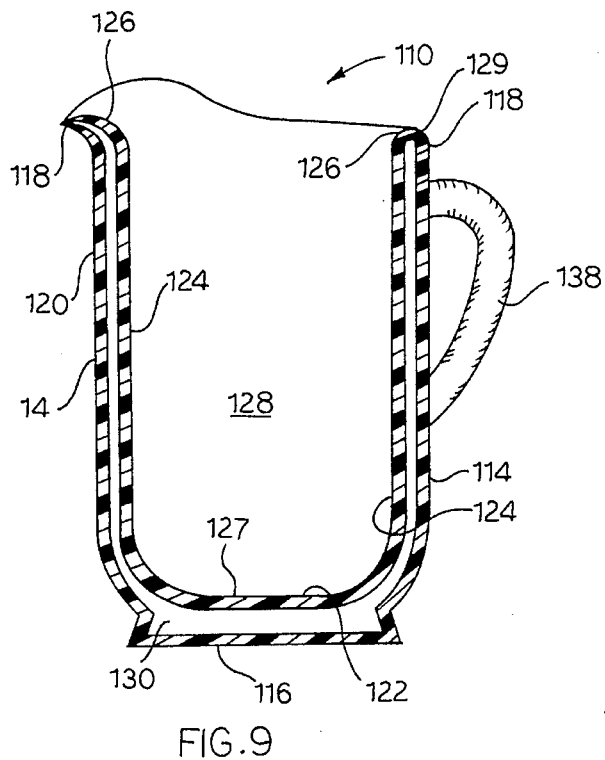
FIG. 9 is a cross-sectional view of the thermal insulating pitcher taken along line 9—9 of FIG. 8.

FIG. 9 shows a cross-sectional view of the thermal insulating pitcher 110. Referring to FIGS. 8 and 9, the thermal insulating pitcher 110 has an interior wall 127 made of plastic material, an exterior wall 120 made of plastic material, and a handle 138. The interior wall 127 has a sidewall portion 124 which is integrally formed with and vertically extending upwardly from a bottom wall portion 122, and has an upper lip 126. The bottom wall portion 122 and the sidewall portion 124 define an interior chamber 128 for retaining beverage. The exterior wall 120 has a sidewall portion 114 which is integrally formed with and vertically extending upwardly from a bottom wall portion 116, and has an upper rim 118. The handle 138 is integrally attached to a location on the sidewall portion 124 of the exterior wall 120 for grasping the pitcher 110. The upper lip 126 is integrally connected to the upper rim 118 of the sidewall portion 114 which forms a top edge 129 of the thermal insulating pitcher 110. The exterior wall 120 and the interior wall 127 are positioned in a substantially parallel and spaced apart relationship, and form a sealed chamber 130 therebetween. The sealed chamber 130 is between the interior wall 127 and the exterior wall 120, and is exhausted of air to create a vacuum chamber for insulating the interior chamber 128 and keep the beverage cold for an extended period of time. The interior wall 127 and the exterior wall 120 are integrally molded together to form a continuous wall which is air-tight The sealed chamber 130 of the thermal insulating pitcher 110 may be partially filled with gas such as carbon dioxide ($CO_2$) or dry nitrogen $N_2$. The advantages of partially filling with $CO_2$ or $N_2$ are as follows: (a) the gas will provide better insulation to the interior chamber 128 of the thermal insulating pitcher 110; and (b) the gas also will provide more support to the bottom wall portion 122 of the interior wall 127.

It will be appreciated that the present invention thermal insulating pitcher 110 is not limited to the molding process. It is also within the spirit and scope of the present invention to form together the interior wall 127 and the exterior 120 in any conventional method known to one skilled in the art.

Figure 10:
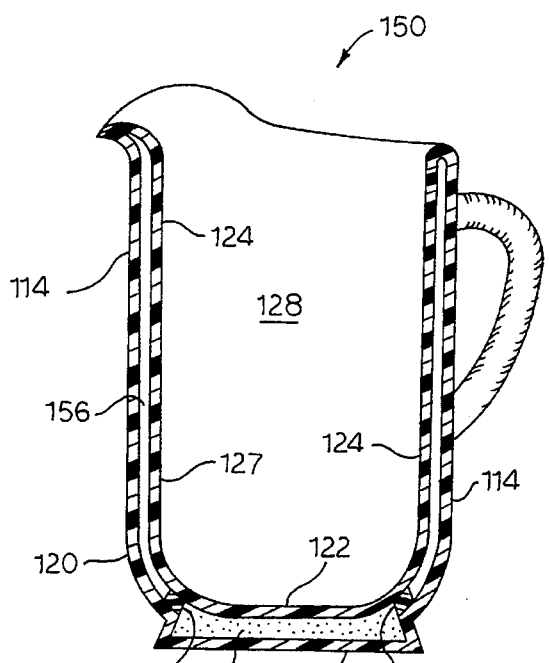
FIG. 10 is a cross-sectional view of an alternative embodiment of the thermal insulating pitcher.

Referring to FIGS. 10, there a shown cross-sectional view of another alternative embodiment of the present invention thermal insulating pitcher 150. It assembles and functions the same as previously described above except that the dead air space between the exterior wall 120 and the interior wall 127 is divided by a continuous partition 152 which separates sealed chamber 130 into two separate sealed chambers 154 and 156. The partition 152 is integrally connected to the bottom wall portion 122 of the interior wall 127 and the bottom wall portion 116 of the exterior wall 120. The sealed side chamber 156 is between the sidewall portion 124 of the interior wall 127 and the sidewall portion 114 of the exterior wall 120, and is exhausted of air, so that this vacuum chamber serves to insulate the beverage within the interior chamber 128. The sealed bottom chamber 154 is between the bottom wall portion 122 of the interior wall 127 and the bottom wall portion 116 of the exterior wall 120, and is partially filled with gas such as $CO_2$ or $N_2$.

Figure 11:
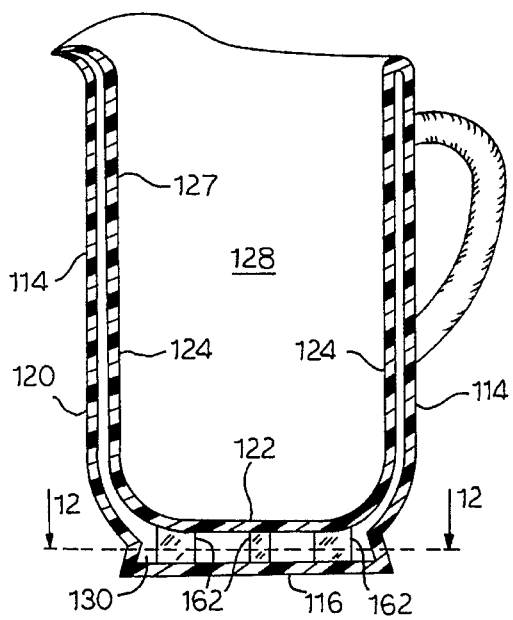
FIG. 11 is a cross-sectional view of another alternative embodiment of the thermal insulating pitcher.
Figure 12:
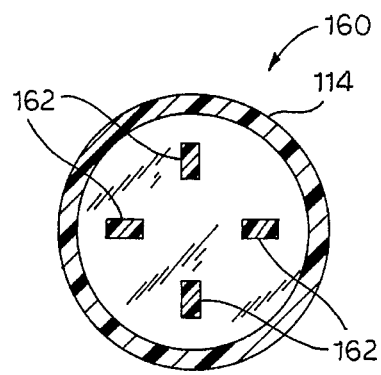
FIG. 12 is a cross-sectional view of the alternative embodiment of the thermal insulating pitcher illustrated in FIG. 11, taken along line 12—12 of FIG. 11.

Referring to FIGS. 11 and 12, there are shown cross-sectional views of still another embodiment of the present invention thermal insulating pitcher 160. It assembles and functions the same as previously described above except that a plurality of ribs 162 are provided between the bottom wall portion 122 of the interior wall 127 and the bottom wall portion 116 of the exterior wall 120. The ribs 162 provide support to the bottom wall portion 122 of the interior wall 127, and keep the bottom wall portions 122 and 116 in a spaced apart relation. Again, the sealed chamber 130 is between the interior wall 127 and the exterior wall 120, and may be a vacuum or may be partially filled with gas such as $CO_2$ or $N_2$.

The manufacturing process which could accommodate the construction of the thermal insulating pitcher 110 may be injection, thermoform, etc. or other molding process. The present invention conforms to conventional forms of manufacture, is of simple construction and is easy to use.

One of the unique features of the present invention is that it is designed and constructed to prevent heat transfer in two forms: convection and conduction. In the case of the convection, heat transfer is prevented by the upper lip 126 of the sidewall portion 124. In the case of the conduction, heat transfer is prevented by the sealed chamber 130.

Another unique feature of the present invention thermal insulating pitcher is that the beverage kept in the pitcher remains cold for an extended period of time. While the interior chamber 128 is approximately the same temperature as the beverage contained within the thermal insulating pitcher, the exterior wall 120 of the pitcher is approximately room temperature, so that liquid does not form on the exterior wall 120 and therefore, it does not sweat. As a result, there are no water stains on the table top and the beverage is kept cold inside the pitcher.

Defined in detail, the present invention is a food container, comprising: (a) a bowl having a double-wall structure, including an interior wall made of metal material and an exterior wall made of plastic material; (b) said interior wall defining an interior chamber and having a bottom wall portion and a sidewall portion, the sidewall portion integrally formed with and upwardly extending from the bottom wall portion, and having a tapered upper lip; (c) said exterior wall having a bottom wall portion and a sidewall portion, the sidewall portion integrally formed with and upwardly extending from the bottom wall portion, and having an upper rim; (d) said exterior and interior walls positioned in a substantially parallel and spaced apart relationship, and said tapered upper lip of said interior wall air-tightly connected to said upper rim of said exterior wall, thereby forming a top edge of said bowl and a sealed chamber between said interior and exterior walls; (e) a lid sized to span said top edge of said bowl for covering said interior chamber of said bowl, and also having a double-wall structure, including a bottom wall made of metal material and a top wall made of plastic material; (f) said top and bottom walls of said lid each having a circumferential edge, said top and bottom walls positioned in a substantially parallel and spaced apart relationship, and the circumferential edge of said top wall air-tightly connected to the circumferential edge of said bottom wall, thereby forming a sealed chamber between said top and bottom walls; (g) said interior wall of said bowl and said bottom wall of said lid being polished for substantially reducing and preventing heat radiation; (h) said sealed chamber of said bowl and said sealed chamber of said lid substantially reducing and preventing heat conduction; and (i) said tapered upper lip of said interior wall of said bowl substantially reducing and preventing heat convection; (j) whereby said container can keep warm for an extended period of time food which is previously warm and placed in said interior chamber.

Defined alternatively in detail the present invention is a beverage pitcher, comprising: (a) a double-wall structure, including an interior wall made of plastic material and an exterior wall made of plastic material; (b) said interior wall defining an interior chamber and having a bottom wall portion and a sidewall portion, the sidewall portion integrally formed with and upwardly extending from the bottom wall portion, and having an upper lip; (c) said exterior wall having a bottom wall portion and a sidewall portion, the sidewall portion integrally formed with and upwardly extending from the bottom wall portion, and having an upper rim; (d) said exterior and interior walls positioned in a substantially parallel and spaced apart relationship, and said lip of said interior wall air-tightly connected to said upper rim of said exterior wall, thereby forming a top rim of said pitcher and a sealed chamber between said interior and exterior walls; (e) said sealed chamber of said pitcher substantially reducing and preventing heat conduction; and (f) said upper lip of said interior wall of said pitcher substantially reducing and preventing heat convection; (g) whereby said pitcher can keep a cold beverage in said interior chamber cold for an extended period of time.

Defined broadly, the present invention is a receptacle, comprising: (a) an interior wall defining an interior chamber and having a bottom wall portion and a sidewall portion, the sidewall portion integrally formed with and upwardly extending from the bottom wall portion, and having an upper lip; (b) an exterior wall having a bottom wall portion and a sidewall portion, the sidewall portion integrally formed with and upwardly extending from the bottom wall portion, and having an upper rim; (c) said exterior and interior walls positioned in a spaced apart relationship, and said upper lip of said interior wall air-tightly connected to said upper rim of said exterior wall, thereby forming a top edge of said receptacle and a sealed chamber between said interior and exterior walls; (d) said sealed chamber substantially reducing and preventing heat conduction; and (e) said upper lip of said interior wall substantially reducing and preventing heat convection; (f) whereby said receptacle can keep previously warm food warm in said interior chamber or a previously cold beverage cold in said interior chamber for an extended period of time.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A food container, comprising:
   a. a bowl having a double-wall structure, including an interior wall made of metal material and an exterior wall made of plastic material;
   b. said interior wall defining an interior chamber and having a bottom wall portion and a sidewall portion, the sidewall portion integrally formed with and upwardly extending from the bottom wall portion, and having a tapered upper lip;
   c. said exterior wall having a bottom wall portion and a sidewall portion, the sidewall portion integrally formed with and upwardly extending from the bottom wall portion, and having an upper rim;
   d. said exterior and interior walls positioned in a substantially parallel and spaced apart relationship, and said tapered upper lip of said interior wall air-tightly connected to said upper rim of said exterior wall, thereby forming a top edge of said bowl and a sealed chamber between said interior and exterior walls;
   e. a lid sized to span said top edge of said bowl for covering said interior chamber of said bowl, and also having a double-wall structure, including a bottom wall made of metal material and a top wall made of plastic material;
   f. said top and bottom walls of said lid each having a circumferential edge, said top and bottom walls positioned in a substantially parallel and spaced apart relationship, and the circumferential edge of said top wall air-tightly connected to the circumferential edge of said bottom wall, thereby forming a sealed chamber between said top and bottom walls;
   g. said interior wall of said bowl and said bottom wall of said lid being polished for substantially reducing and preventing heat radiation;
   h. said sealed chamber of said bowl and said sealed chamber of said lid substantially reducing and preventing heat conduction; and
   i. said tapered upper lip of said interior wall of said bowl substantially reducing and preventing heat convection;
   j. whereby said container can keep warm for an extended period of time food which is previously warm and placed in said interior chamber.

2. The food container as defined in claim 1 wherein said bottom wall of said lid and said interior wall of said bowl are made of aluminum material.

3. The food container as defined in claim 1 wherein said bottom wall of said lid and said interior wall of said bowl are made of stainless steel material.

4. The food container as defined in claim 1 wherein air is exhausted from said sealed chamber of said bowl and said sealed chamber of said lid, thereby forming vacuum chambers for insulating said interior chambers.

5. The food container as defined in claim 1 wherein said sealed chamber of said bowl and said sealed chamber of said lid are partially filled with carbon dioxide ($CO_2$) or dry nitrogen ($N_2$) for insulating said interior chambers.

6. The food container as defined in claim 1 further comprising at least one handle attached to said top wall of said lid.

7. The food container as defined in claim 1 further comprising a plurality of ribs attached between said bottom wall portions of said interior wall and said exterior wall respectively for supporting said interior chamber.

8. The food container as defined in claim 1 further comprising a partition integrally attached between said bottom wall portions of said interior wall and said exterior wall respectively, and dividing said sealed chamber of said bowl into a sealed side chamber and a sealed bottom chamber.

9. The food container as defined in claim 8 wherein said sealed bottom chamber is partially filled with carbon dioxide ($CO_2$) or dry nitrogen ($N_2$) for insulating said interior chamber.

10. The food container as defined in claim 8 wherein air is exhausted from said sealed side chamber of said bowl, thereby forming a vacuum chamber for insulating said interior chamber.

11. A receptacle, comprising:
    a. an interior wall made of metal material and defining an interior chamber and having a bottom wall portion and a sidewall portion, the sidewall portion integrally formed with and upwardly extending from the bottom wall portion to form an upper lip;
    b. an exterior wall made of plastic material and having a bottom wall portion and a sidewall portion, the sidewall portion integrally formed with and upwardly extending from the bottom wall portion to form an upper rim;
    c. said exterior and interior walls positioned in a spaced apart relationship, and said upper lip of said interior wall air-tightly connected to said upper rim of said exterior wall, thereby forming a top edge of said receptacle and a sealed chamber between said interior and exterior walls;
    d. said sealed chamber substantially reducing and preventing heat conduction;
    e. said upper lip of said interior wall substantially reducing and preventing heat convection; and f. a cover sized to span said top edge of said receptacle for covering said interior chamber, and having a double-wall structure, including a bottom wall made of metal material and a top wall made of plastic material, the top and bottom walls of the cover each having a circumferential edge, the top and bottom walls positioned in a spaced apart relationship, and the circumferential edge of the top wall air-tightly connected to the circumferential edge of the bottom wall, thereby forming a sealed chamber between the top and bottom walls;

g. whereby said receptacle can keep previously warm food warm in said interior chamber or a previously cold beverage cold in said interior chamber for an extended period of time.

12. The receptacle as defined in claim 11 wherein said metal material of said interior wall is polished aluminum.

13. The receptacle as defined in claim 11 wherein said metal material of said interior wall is polished stainless steel.

14. The receptacle as defined in claim 11 wherein air is exhausted from said sealed chamber of said receptacle, thereby forming a vacuum chamber for insulating said interior chamber.

15. The receptacle as defined in claim 11 wherein said sealed chamber of said receptacle is partially filled with carbon dioxide ($CO_2$) or dry nitrogen ($N_2$) for insulating said interior chamber.

16. The receptacle as defined in claim 11 further comprising at least one rib attached between said bottom wall portions of said interior wall and said exterior wall respectively for supporting said interior chamber.

17. The receptacle as defined in claim 11 further comprising a partition integrally attached between said bottom wall portions of said interior wall and said exterior wall respectively, and dividing said sealed chamber of said receptacle into a sealed side chamber and a sealed bottom chamber.

18. The receptacle as defined in claim 17 wherein said sealed bottom chamber is partially filled with carbon dioxide (COThd 2) or dry nitrogen ($N_2$) for insulating said interior chamber.

19. The receptacle as defined in claim 17 wherein air is exhausted from said sealed side chamber, thereby forming a vacuum chamber for insulating said interior chamber.

20. The receptacle as defined in claim 11 wherein said sealed chamber of said cover is partially filled with carbon dioxide ($CO_2$) or dry nitrogen ($N_2$) for insulating said interior chamber of said receptacle.

21. The receptacle as defined in claim 11 wherein air is exhausted from said sealed chamber of said cover, thereby forming a vacuum chamber for insulating said interior chamber of said receptacle.

22. A food container, comprising:
a. a bowl having a double-wall structure, including an interior wall made of metal material and an exterior wall made of plastic material;
b. said interior wall defining an interior chamber and having a bottom wall portion and a sidewall portion, the sidewall portion integrally formed with and upwardly extending from the bottom wall portion to form a tapered upper lip;
c. said exterior wall having a bottom wall portion and a sidewall portion, the sidewall portion integrally formed with and upwardly extending from the bottom wall portion to form an upper rim;
d. said exterior and interior walls positioned in a substantially parallel and spaced apart relationship, and said tapered upper lip of said interior wall air-tightly connected to said upper rim of said exterior wall, thereby forming a top edge of said bowl and a sealed chamber between said interior and exterior walls;
e. said interior wall of said bowl being polished for substantially reducing and preventing heat radiation;
f. said sealed chamber of said bowl substantially reducing and preventing heat conduction;
g. a lid sized to span said top edge of said bowl for covering said interior chamber of said bowl and having a double-wall structure, including a bottom wall made of metal material and a top wall made of plastic material;
h. said top and bottom walls of said lid each having a circumferential edge. said top and bottom walls positioned in a substantially parallel and spaced apart relationship, where the circumferential edge of said top wall is air-tightly connected to the circumferential edge of said bottom wall, thereby forming a sealed chamber between said top and bottom walls; and
i. said tapered upper lip of said interior wall of said bowl substantially reducing and preventing heat convection;
j. whereby said container can keep warm for an extended period of time food which is previously warm and placed in said interior chamber.

23. The food container as defined in claim 22 wherein air is exhausted from said sealed chamber of said bowl, thereby forming a vacuum chamber for insulating said interior chamber.

24. The food container as defined in claim 22 wherein said sealed chamber of said bowl is partially filled with carbon dioxide ($CO_2$) or dry nitrogen ($N_2$) for insulating said interior chamber.

* * * * *